US008529331B2

(12) United States Patent
Kim

(10) Patent No.: US 8,529,331 B2
(45) Date of Patent: Sep. 10, 2013

(54) ONLINE CAPSULE LOTTERY SYSTEM AND METHOD FOR SAME

(75) Inventor: Gijin Kim, Seoul (KR)

(73) Assignee: Redduck Inc., Gangnam-Gu, Seoul (KR)

( * ) Notice: Subject to any disclaimer, the term of this patent is extended or adjusted under 35 U.S.C. 154(b) by 11 days.

(21) Appl. No.: 13/147,857

(22) PCT Filed: Dec. 24, 2009

(86) PCT No.: PCT/KR2009/007813
§ 371 (c)(1), (2), (4) Date: Aug. 4, 2011

(87) PCT Pub. No.: WO2011/030972
PCT Pub. Date: Mar. 17, 2011

(65) Prior Publication Data

US 2011/0294558 A1 Dec. 1, 2011

(30) Foreign Application Priority Data

Sep. 10, 2009 (KR) ........................ 10-2009-0085537

(51) Int. Cl.
*G06F 17/00* (2006.01)

(52) U.S. Cl.
USPC ............................................................ 463/17

(58) Field of Classification Search
None
See application file for complete search history.

(56) References Cited

U.S. PATENT DOCUMENTS 8,090,618 B1 * 1/2012 Chu ............................ 705/26.1
8,108,459 B1 * 1/2012 Hoffman et al. .............. 709/203
2004/0143852 A1 * 7/2004 Meyers ......................... 725/133

(Continued)

FOREIGN PATENT DOCUMENTS

KR 10-2001-0112557 12/2001
KR 10-2005-0025515 3/2005
KR 10-2005-0074878 7/2005
KR 10-2006-0105366 10/2006

OTHER PUBLICATIONS

Wilson, T., The 'How Stuff Works' Web the article entitled "How World of Warcraft Works", no date listed, www.howstuffworks.com, available from http://electronics.howstuffworks.com/world-of-warcraft.htm, downloaded by the USPTO on Jul. 10, 2012 from the archive.org website, with archive.org verified dates in Sep. 2008.*

(Continued)

*Primary Examiner* — Sunit Pandya
*Assistant Examiner* — Nicholas Ditoro
(74) *Attorney, Agent, or Firm* — John K. Park; Park Law Firm

(57) ABSTRACT

An online capsule lottery system and method provides a lottery event in which a plurality of capsules are included in an online game. High-grade item contents having a high ability ranking in the online game is matched to at least one of the capsules, and lottery results are determined after capsules are extracted by the selection of the user. Even a player that has only recently begun playing the online game is given the opportunity to purchase a desired amount of the capsules and the chance to possess the high-grade item contents, thus enabling the player to easily become familiar with the online game. By adjusting winning odds in accordance with various ways of matching high-grade item contents with capsules, capsule purchase accumulation, and time of capsule purchase, the system and method prevent the balance of a game from being disrupted due to an indiscriminate distribution of items.

5 Claims, 10 Drawing Sheets

(a) (b)

(56) References Cited

U.S. PATENT DOCUMENTS

| | | | | |
|---|---|---|---|---|
| 2006/0052168 | A1* | 3/2006 | Shacham | 463/42 |
| 2008/0098064 | A1* | 4/2008 | Sherinian | 709/203 |
| 2013/0143670 | A1* | 6/2013 | Junkin et al. | 463/42 |

OTHER PUBLICATIONS

Blizard Entertainment, The computer game Diablo II, released in Jun. 2000 and Jul. 2000, www.Blizzard.com, as evidenced by the game manual.*

Martinsen, J., The 'Danwei' web article entitled "Gamble Your Life Away in ZT Online" posted Dec. 16, 2007, and downloaded from archive.org by the USPTO on Sep. 21, 2012, with an archive.org verified date of Jan. 7, 2008.*

The computer game "World of Warcraft", as evidenced by the web page http://www.wowwiki.com/Reinforced_Steel_Lockbox, retreived from www.archive.org with an archive.org reported date of Sep. 24, 2008.*

The computer game "World of Warcraft", as evidenced by the web page http://www.wowwiki.com/Bag, retreived from www.archive.org with an archive.org reported date of May 6, 2009.*

* cited by examiner

ONLINE CAPSULE LOTTERY SYSTEM AND METHOD FOR SAME

CROSS-REFERENCE TO RELATED APPLICATION

This application claims the benefit of Korean Application No. 10-2009-0085537, filed on Sep. 10, 2009, with the Korean Intellectual Property Office, the disclosure of which is incorporated herein by reference.

TECHNICAL FIELD

The present invention relates to an online capsule lottery system and method for same which provides a lottery event in which a plurality of capsules are included in an online game, wherein high-grade item contents having a high ability ranking in the online game is matched to at least one of the capsules, and lottery results are determined after capsules are extracted by the selection of the user, so as to provide the high-grade item contents.

BACKGROUND ART

With advance of high-speed Internet communication networks, various types of on-line games have been released. An online game is an established social phenomenon beyond exciting players who play the on-line game by implementing not only all situations and objects existing in reality but also non-existent world view as a program to allow user to experience them indirectly.

Further, with rapid advance of integration of PC hardware to support the high-speed Internet communication networks, as traffics produced by high-specification programs can be constantly communicated through networks, online games have been endowed with more extensive diversity and have been pushed to a level so high as to not distinguish between real and virtual worlds in terms of graphics.

Accordingly, genres of online games have been increasingly diversified and most of on-line game genres being spotlighted in recent years are involved in Role Playing Game (RPG) and First Person Shooting (FPS).

On-line games of RPG and FPS genres may form a game group composed of many players, such as a clan or a party, to compete with other groups beyond causing competition among players. In this event, group competitiveness may include coordination between players as well as players' individual competence.

Players' individual competence depends greatly on items possessed by players as well as game operating skills. In particular, a vast amount of items are provided due to the nature of RPG and FPS genres and their features and types based on creation of producers are not limited. In addition to the RPG and FPS genres, items are extending their activity range with special ability as sports games and battle games appear online.

Among these items, items having considerable ability ranking in online games are classified as high-grade items which are expensive and highly-rare items to be purchased with game money spent in online games. Accordingly, such high-grade items can be acquired through playing the games as long as possible or purchased with obtained experience values converted to game money.

As described above, since the high-grade items have considerable ability ranking in the online games, they can cover some degrees of insufficient experience of beginning game players.

However, since such online game beginning players have difficulty in acquiring such high-grade items and thus start with basic items having relatively low ability ranking, it may take a longer time to be familiar with the online games than experienced players having the high-grade items. In addition, since experienced players belonging to a party or a clan lay stress on results of the party or clan, many beginning players lose interest in the online games early, seceding from the online games.

In addition, in practice, many experienced players possessing the high-grade items make ill use of the beginning players' desire to play a role in the games for the purpose of making huge profits from beginning players through cash transactions of the high-grade items, which is becoming a serious social problem.

However, if high-grade items are indiscriminately provided in online games to overcome the above problem, a game balance is collapsed to make experienced players losing interest in the games, which may result in weakened competitiveness of the games.

Accordingly, there is a need of systematic solutions of online games to overcome both problems of encashment of game items and collapse of game balance.

DISCLOSURE

Technical Problem

Accordingly, it is an object of the present invention to provide an online capsule lottery system which draws for high-grade item contents used in an online game by lottery in matching to at least one capsules, so that even a player that has only recently begun playing the online game is given the opportunity to purchase a desired amount of the capsules and the chance to possess the high-grade item contents, thus enabling the player to easily become familiar with the online game.

It is another object of the present invention to provide an online capsule lottery system which is capable of adjusting winning odds in accordance with various ways of matching high-grade item contents with capsules in order to prevent the balance of a game from being disrupted due to an indiscriminate distribution of items.

It is still another object of the present invention to provide an online capsule lottery system which is capable of raising the level of participation of users in a lottery system as well as promotional effects of an online game by increasing the number of players who participate in the lottery system with beginning players who use high-grade item contents acquired through the lottery system in the online game.

Technical Solution

To achieve the above objects, according to an aspect of the invention, there is provided an online capsule lottery system for providing high-grade item contents having high ability ranking measured on an online game through lottery, including: a game contents provision server which provides contents related to the online game; a plurality of client terminals which provides user log-in information and selection information and participates in capsule lottery; a membership server which stores user's membership information corresponding to the log-in information; and a capsule lottery server which generates matching information by matching the high-grade item contents used in the online game to at least one of numbered capsules in association with the game contents provision server, provides residual capsule information to the client terminals in real time, extracts the number of capsules desired by the users or designated ones from the capsules based on the selection information of the client terminals, determines whether or not there exist won capsules matched to the high-grade item contents based on the matching information, provides information on winning or not to the client terminals, and registers the high-grade item contents with the membership information of the membership server if there exist the won capsule.

The game contents provision server may apply the high-grade item contents registered with the membership server by the capsule lottery server at starting the game in association with the membership information.

The matching information may be determined before or during progress of lottery in a predetermined manner.

The capsule lottery server may include basic item contents having lower ability ranking than the high-grade item contents in the matching information in matching of the basic item contents to capsules, and registers the basic item contents with the membership information based on the selection information of the client terminals if capsules corresponding to the basic item contents are extracted. The capsule lottery server may generate the matching information by matching the high-grade item contents to a minority of capsule information and matching the basic item contents to a majority of capsule information.

The basic item contents may include coupons and the game contents provision server may provide item contents corresponding to the coupons depending on whether or not the client terminals use the coupons registered with the membership information.

The selection information may include user-designated capsule number information or information on at least one specific capsules selected by the user through a capsule lottery interface displayed on the client terminals by the capsule lottery server.

The client terminals may register information on desired ones of item contents provided by the game contents provision server except the high-grade item contents with the membership information of the membership server, and the capsule lottery server may pay and register the desired item contents, along with the high-grade item contents, with the membership information of the membership server at the time of winning before the number of residual capsules reaches the predetermined number.

The capsule lottery server may generate at least one of lottery event information including the predetermined number of capsules including at least one of the matching information, and provide a list of lottery event information to the client terminals. The capsule lottery server may provide information on high-grade item contents included in the lottery event information, and the client terminals may participate in the lottery event information including high-grade item contents desired by users based on the selection information and select the capsules included in the lottery event information.

The capsule lottery server may generate the lottery event information by increasing the total number of capsules with increase in ability ranking of the high-grade item contents included in the lottery event information.

The capsule lottery server may generate capsule purchase accumulation information by accumulating the number of capsules purchased by the users in the membership information of the membership server based on the log-in information and selection information, and increase winning odds of the high-grade item contents with increase in the capsule purchase accumulation information. The capsule lottery server may decrease the winning odds by initializing the capsule purchase accumulation information when the high-grade item contents are registered with the membership information of the membership server through the won capsule. The capsule lottery server may decrease the winning odds to a reference probability with time. The capsule lottery server may decrease the winning odds below the reference probability when the high-grade item contents are registered, and increase the winning odds to the reference probability with time.

The capsule lottery server may provide information on winning or not to other client terminals which participate in the capsule lottery.

To achieve the above objects, according to another aspect of the invention, there is provided an online capsule lottery method in which a capsule lottery server in association with a game contents provision server providing an online game and a membership server providing membership information provides high-grade item contents having high ability ranking measured in the online game to one of a plurality of client terminals which participates in lottery, including: a first step in which the client terminals access the capsule lottery server by providing log-in information of users to the game contents provision server; a second step in which the capsule lottery server generates matching information by matching the high-grade item contents to at least one of capsules and delivers information on the number of residual capsules to the plurality of client terminals in real time; a third step in which the capsule lottery server receives selection information of the client terminals and extracts the number of capsules desired by the users or designated ones from the capsules; and a fourth step in which the capsule lottery server determines whether or not there exist won capsules matched to the high-grade item contents among the capsules extracted through the third step based on the matching information, provides information on winning or not to the client terminals, registers the high-grade item contents with the membership information of the membership server if there exist the won capsule, and provides information on the number of residual capsules generated except the extracted capsules to the plurality of client terminals in real time if there exists no won capsule.

The online capsule lottery method may further include: after the fourth step, a fifth step in which the game contents provision server applies the high-grade item contents registered with the membership server at starting the game in association with the membership information.

In the second step, the capsule lottery server may determine the matching information before or during progress of the game in a predetermined manner. The matching information may further include information on capsules matched to basic item contents having lower ability ranking than the high-grade item contents.

The second step may include a step in which the capsule lottery server generates the matching information by matching the high-grade item contents to a minority of capsule information and matching the basic item contents to a majority of capsule information. The fourth step may include a step in which the capsule lottery server registers the basic item contents with the membership information if there exist capsules matched to the basic item contents.

The basic item contents may include coupons and the fourth step may include a step in which the game contents provision server provides item contents corresponding to the coupons depending on whether or not the coupons registered with the membership information are used.

The selection information may include user-designated capsule number information or information on at least one specific capsules selected by the user through a capsule lottery interface displayed on the client terminals by the capsule lottery server. The client terminals may include information on desired ones of item contents provided by the game contents provision server except the high-grade item contents in the membership information of the membership server, and the fourth step may further include a step in which the capsule lottery server registers the desired item contents, along with the high-grade item contents, with the membership information at the time of winning before the number of residual capsules reaches the predetermined number.

The second step may include a step in which the capsule lottery server generates at least one of lottery event information including the predetermined number of capsules including at least one of the matching information, and provides the lottery event information to the client terminals.

The second step may further include a step in which the capsule lottery server provides information on high-grade item contents included in the lottery event information, and the third step may include a step of selecting capsules from the lottery event information including high-grade item contents desired by users based on the selection information.

The online capsule lottery method may further include: after the fourth step, a sixth step in which the capsule lottery server generates capsule purchase accumulation information by accumulating the number of capsules purchased by the users in the membership information of the membership server based on the log-in information and selection information, and increases winning odds of the high-grade item contents with increase in the capsule purchase accumulation information. The sixth step may further include a step in which the capsule lottery server decreases the winning odds by initializing the capsule purchase accumulation information when the high-grade item contents are registered with the membership information of the users through the won capsule in the fourth step. The sixth step may further include a step in which the capsule lottery server decreases the winning odds to a reference probability with time. The sixth step may further include a step in which the capsule lottery server decreases the winning odds below the reference probability when the high-grade item contents are registered, and increases the winning odds to the reference probability with time.

The fourth step may include a step in which the capsule lottery server provides information on winning or not to other client terminals which participate in the capsule lottery.

Advantageous Effects

The online capsule lottery system of the present invention has an advantage in that it draws for high-grade item contents used in an online game by lottery in matching to at least one capsules, so that even a player that has only recently begun playing the online game is given the opportunity to purchase a desired amount of the capsules and the chance to possess the high-grade item contents, thus enabling the player to easily become familiar with the online game.

The online capsule lottery system of the present invention has another advantage in that it increases the level of participation of users who participate in the online capsule lottery system as all users can confirm winning odds through real time confirmation of capsule states and uniformly increases the level of participation throughout progress of online games by further providing desired items to users who participate in the game in an initial stage, apart from high-grade item contents.

The online capsule lottery system of the present invention has another advantage in that it prevents the balance of a game from being disrupted due to an indiscriminate distribution of items and also encourages the continued participation of users in the capsule lottery service in order to raise the level of participation in the lottery system by adjusting winning odds in accordance with various ways of matching high-grade item contents with capsules, capsule purchase accumulation, and time of capsule purchase.

The online capsule lottery system of the present invention has another advantage in that it raises the level of participation of users in a lottery system as well as promotional effects of an online game by increasing the number of players who participate in the lottery system with beginning players who use high-grade item contents acquired through the lottery system in the online game.

MODE FOR INVENTION

The present invention involves an online capsule lottery system and method in which an online game server providing an online game provides high-grade item contents having high-grade ability ranking and scarcity among various types of item contents used in the online game, so that even online game beginners can participate in the lottery to acquire high-grade item contents and adapt to the game among experienced players.

Figure 1:
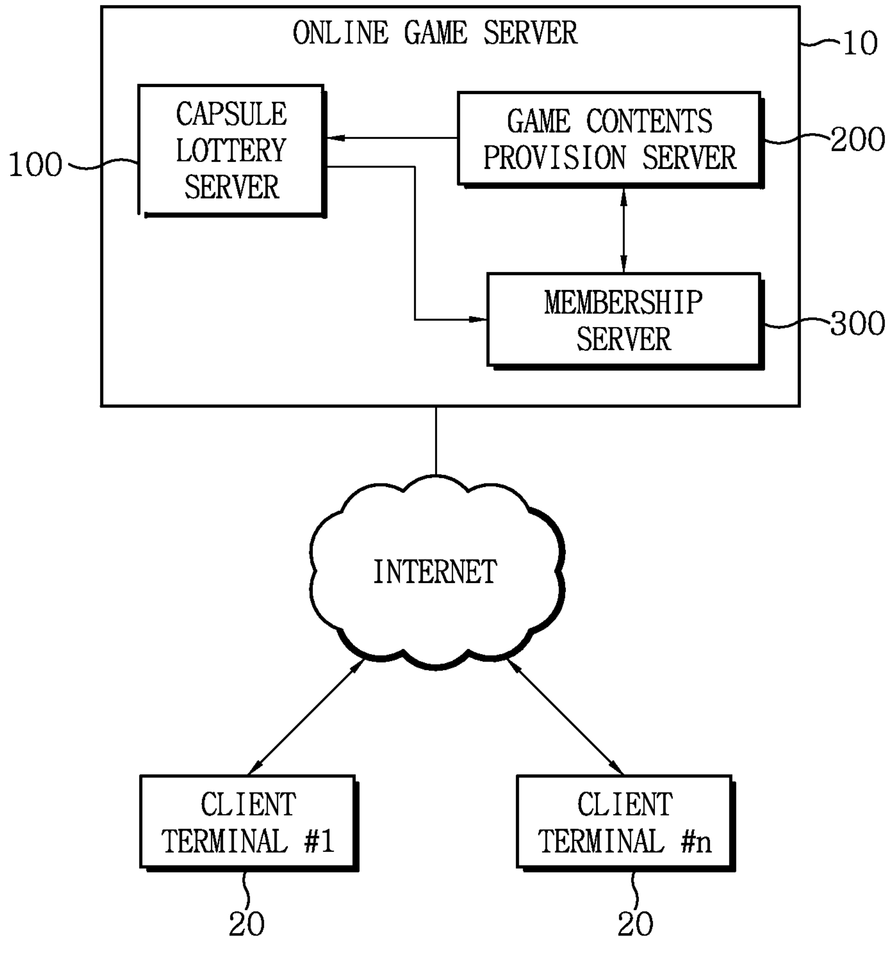
FIG. 1 is a view showing an exemplary online capsule lottery system according to an embodiment of the invention.

In order to operate the above lottery system, as shown in FIG. 1, an online capsule lottery system may include an online game server 10 including a game contents provision server 200 which provides contents related to various types of games, including item contents, a membership server 300 which manages information on members who access the online game server to receive the game contents, and a capsule lottery server 100 which provides online capsule lottery services to client terminals used by the members in association with the game contents provision server and the membership server.

In view of a procedure in which the client terminals 20 access the capsule lottery server 100 based on the above-described configuration, the client terminals 20 transmit log-in information to the online game server 10 through Internet and the game contents provision server 200 authenticates users of the client terminals 20 based on the log-in information and, if the users are authenticated, provides the users with various types of game contents.

At this time, the game contents provision server 200 registers link information to link an access to the capsule lottery server 100 on web sites, which are provided to the client terminals 20, and the client terminals 20 can access the capsule lottery server 100 through the link information.

In the meantime, in order to register information exchanged between the client terminals 20, which participate in the online capsule lottery service, and the capsule lottery server 100 and apply this information to the game contents provision server 200, the membership server 300 may registers the exchanged information with a list of membership information corresponding to the log-in information of the client terminals 20 and provide the registered information to the game contents provision server 200.

Upon verifying the access by the client terminals 20, the capsule lottery server 100 provides a capsule lottery service to the web site of the client terminals 20, which will be described in detail below in connection with a capsule lottery server of FIG. 2.

Figure 2:
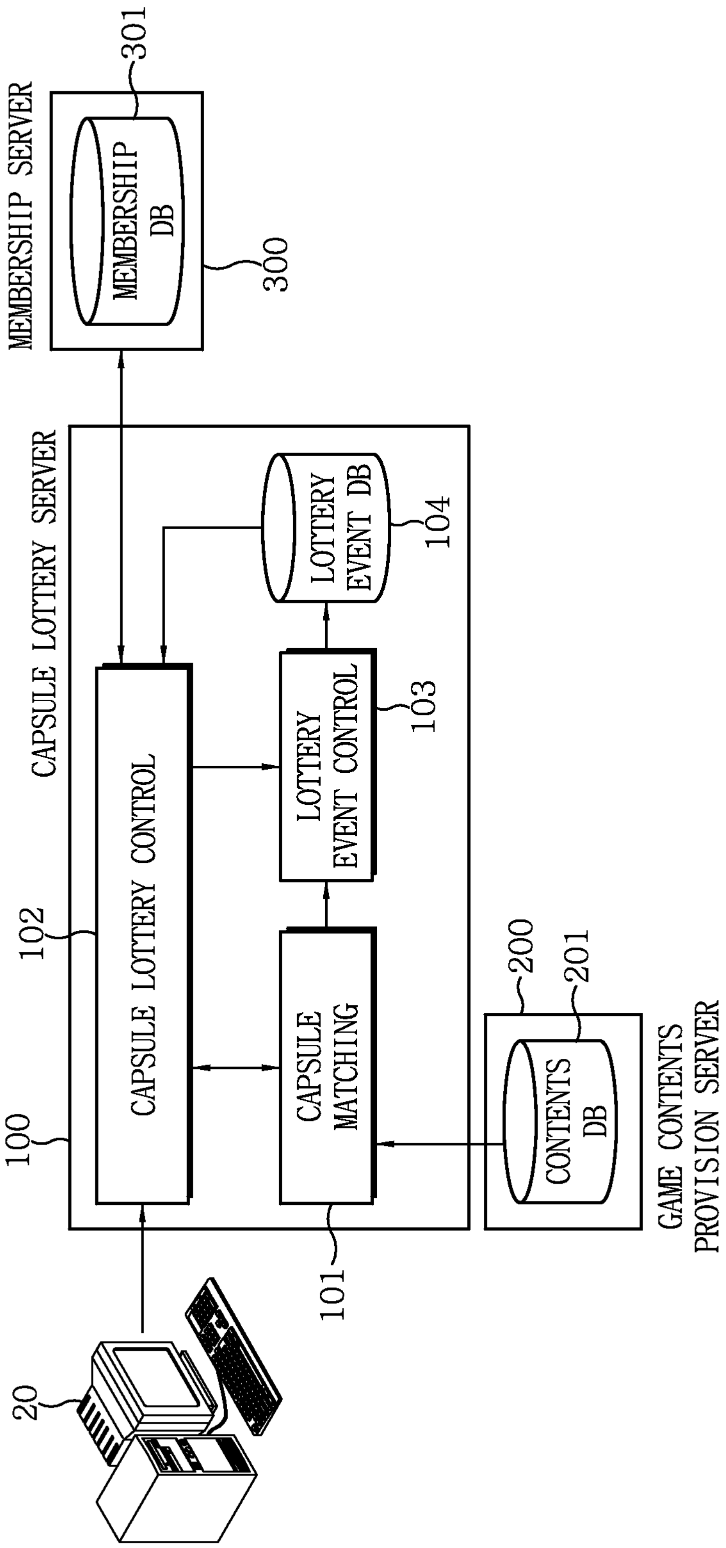
FIG. 2 is a view showing a capsule lottery server according to an embodiment of the invention.

As shown in FIG. 2, the capsule lottery system includes a capsule matching section 101 which produces matching information by extracting high-grade item contents stored in a contents database (DB) 201 of the game contents provision server 200 and matching the high-grade item contents to one of numbered capsules, and a capsule lottery control section 102 which determines high-grade item contents to be extracted by the capsule matching section 101, draws a lottery and provides information on winning to the client terminals 20.

In detail for a capsule lottery process based on the above configuration, under control of the capsule lottery control section 102, the capsule matching section 101 may extract high-grade item contents from the contents DB 201 of the game contents provision server 200, match the extracted high-grade item contents to one of a plurality of capsules, and provide the capsule lottery control section 102 with matching information including information on the capsule to which the high-grade item contents are matched.

In some embodiments, the capsule matching section 101 may increase winning odds by matching the high-grade item contents to one or more capsules, or may cause one lottery event to offer a plurality of high-grade item contents by matching two or more high-grade item contents to corresponding respective capsules.

In addition to determining how to match the high-grade item contents to any capsule, the capsule matching section 101 may set the matching information as winning odds for the high-grade item contents of respective capsules and the capsule lottery control section 102 may provide high-grade item contents by determining a winning in the course of progress of lottery based on winning odds of a capsule extracted by the client terminals 20.

In addition, even upon receiving the matching information from the capsule matching section 101, the capsule lottery control section 102 may control the matching information, such as changing a capsule matched to high-grade item contents or altering winning odds, in real time based on membership information of users. In this case, as membership information of users which has an effect on alteration of the matching information, details of capsules purchased in order for the users to participate in the lottery, the number of previous winnings of high-grade item contents, etc. may be included. Accordingly, it is possible to control winning by altering the matching information of the extracted capsules at the moment when the client terminals 20 extract the capsules as well as before the progress of lottery.

In addition, the capsule lottery control section 102 may control winning odds by controlling the number of capsules to be included in one capsule lottery event. For example, the number of capsule to be assigned for the lottery event may increase with increase in ability ranking of the high-grade item contents to raise winning odds.

In the meantime, the capsule lottery control section 102 may control the capsule matching section 101 to pause the matching when the number of capsules matched by the capsule matching section 101 reaches a predetermined number, and generate a piece of lottery event information which is then delivered to the plurality of client terminals 20. In this case, the generated lottery event information may include not only the capsules themselves but also the number of capsules which are included in the lottery event information. The number of capsules may be changed in real time by the capsule lottery control section 102 whenever the client terminals extract capsules. Accordingly, the capsule lottery control section 102 may provide the plurality of client terminals 20, in real time, with the number of residual capsules except the extracted capsules. This allows users to a degree of winning odds based on the number of residual capsules remaining until winning of high-grade item content is established.

The client terminals 20 participated in the lottery event may provide the capsule lottery control section 102 with user selection information input by users. In this case, the selection information may be the number of capsules desired by users or information on one or more capsules designed by the user.

Prior to the input of the selection information, the capsule lottery control section 102 may provide game money used in online games to purchase the capsules in order for users to participate in the lottery event, or cash contents to allow the users to purchase the capsules with cash. Accordingly, the capsule lottery control section 102 may restrict the client terminals 20 to input selection information on the capsules within the limit of the game money or cash contents.

Thereafter, the capsule lottery control section 102 may extract capsules included in the lottery event based on the selection information and determine whether or not the high-grade item contents are won through the extracted capsules based on the matching information.

If the high-grade item contents are won through the extracted capsules, the capsule lottery control section 102 may register the high-grade item contents included in the matching information with the member DB 301 included in the membership server 300, initialize the lottery event information including the high-grade item contents, and end the lottery. Otherwise, the capsule lottery control section 102 maintains the lottery event in a state where the number of residual capsules except the extracted capsules among the total of capsules included in the lottery event information is provided to the plurality of client terminals 20 participated in the lottery event.

Through the above-described process, the game content provision server 200 interlocking with the membership server 300 may apply the high-grade item contents registered with the member DB 301 by the winning. At this time, the member DB 301 may include inventory information on equipment possessed by characters of users on an online game. The high-grade item contents may be registered with the inventory information.

In the meantime, since an online game is accessed by a plurality of users, there is a need to generate a plurality of lottery events to be provided to the user. To this end, a lottery event control section 103 may be further included to control the capsules matched by the capsule matching section 101 to generate a plurality of lottery events including capsules matched to at least one high-grade item contents, so that a plurality of lotteries is performed in real time in the plurality of different lottery events.

The lottery event control section 103 may receive matching information included in one lottery event reaching a predetermined number and generate various types of lottery event information to be stored in a lottery event DB 104. Accordingly, each of the various types of lottery event information includes matching information and high-grade item contents included in the matching information may be the same or different contents for each of the various types of lottery event information.

As described above, the capsule lottery control section 102 may generate a lottery event list based on the various types of lottery event information stored in the lottery event DDB 104 and provide it to the client terminals 20 which may then participate in a desired one of lottery events included in the lottery event list based on user selection information.

In this case, the lottery event list may include the number of capsules and the capsule lottery control section 102 may update the lottery event list by reflecting the number of capsules varying with progress of lottery for each lottery event in real time.

In addition, the capsule lottery control section 102 may provide information in high-grade item contents won through a corresponding lottery event to the client terminals 20 based on the lottery event information, and user may confirm the high-grade item contents and participate in a lottery event including desired high-grade item contents.

With reference made to the above-described configuration, an interface of the capsule lottery server 100 to verify access information of the client terminals 20 and provide lottery event information of the client terminals to a web site will be described with reference to FIG. 3.

Figure 3:
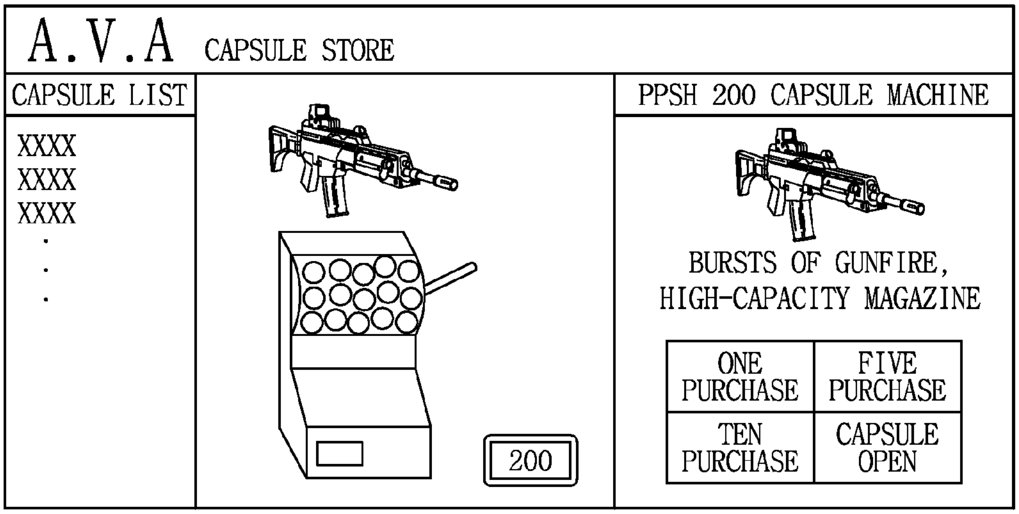
FIG. 3 is a view showing an interface provided by the capsule lottery server according to an embodiment of the invention.

Referring to FIG. 3, the above lottery event list corresponds to a capsule list shown in FIG. 3 and a capsule machine indicated in the capsule list corresponds to the lottery event information. In addition, the lottery event information may provide information on the number of capsules possessed by the capsule machine and high-grade item contents. As shown, high-grade item contents possessed by the capsule machine may be displayed on the top of a capsule machine model.

In addition, when the client terminals select one capsule machine corresponding to the lottery event information based on the user selection information, additional information corresponding to the selected capsule machine may be provided as shown in the right side of FIG. 3. The additional information may include information on ability ranking of the high-grade item contents in an online game, the number of capsules possessed by the capsule machine and displayed on the right and bottom adjacent to the capsule machine model shown in FIG. 3, and the number of residual capsules left after capsule extraction. In particular, the information on the number of residual capsules may be varied in real time according to capsule extraction by the plurality of client terminals.

Thereafter, the client terminals may deliver the user selection information (for example, 'one, five, ten drawings' shown in FIG. 3) to the capsule lottery control section, and then the capsule lottery control section may receive a confirmation request ('capsule open' shown in FIG. 3) for winning of capsules extracted by the client terminals, determine winning or not of the capsules extracted by the client terminals based on the matching information, and deliver information on the winning or not to the client terminals.

Figure 4:
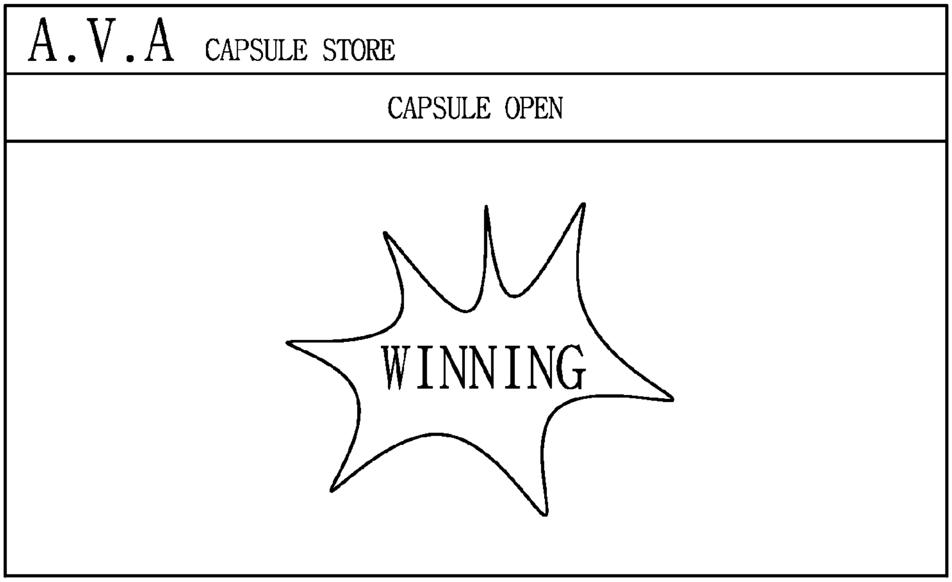
FIGS. 4 and 5 are views showing an example of provision of information on winning by the capsule lottery server according to an embodiment of the invention.
Figure 5:
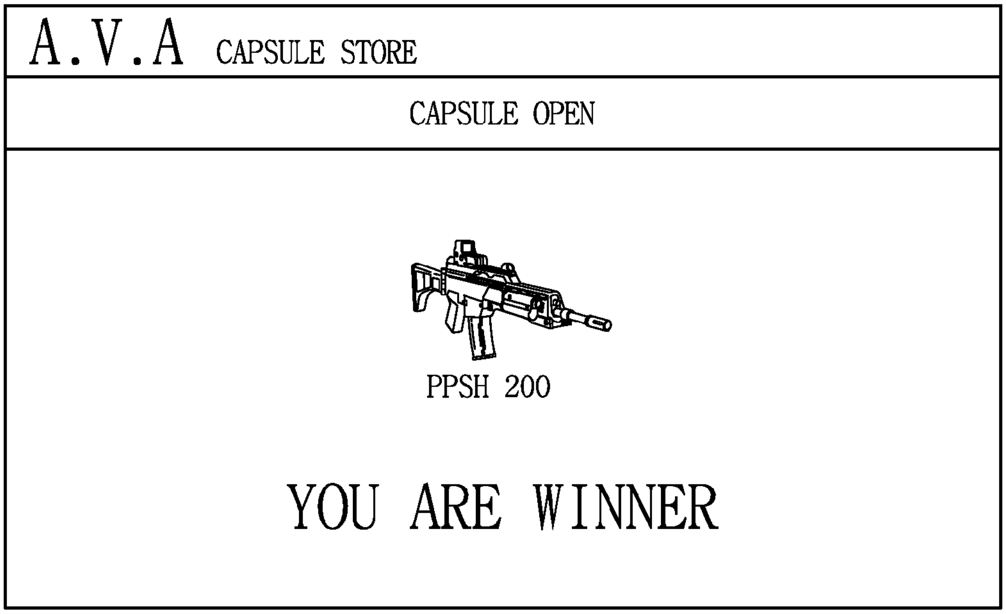

FIGS. 4 and 5 are views showing an example of information on winning or not provided to the client terminals by the capsule lottery control section, in which, if the client terminals extract capsules matched to high-grade item contents, the capsule lottery control section may display information corresponding to winning and further display information about won high-grade item contents to be registered with the membership information of the member DB to allow users of the client terminals to know such information.

At this time, the capsule lottery control section may provide the information on winning or not to not only the client terminals but also other client terminals participating in the lottery event including the capsules extracted by the client terminals to ensure transparent and fair lottery.

If winning is made through the extracted capsules, the capsule lottery control section may control the lottery event control section to initialize the capsule machine and replace this capsule machine with a capsule machine including matching information about new high-grade item contents and capsules. If no winning is made, the number of residual capsules may be displayed while maintaining the capsule machine.

Figure 6:
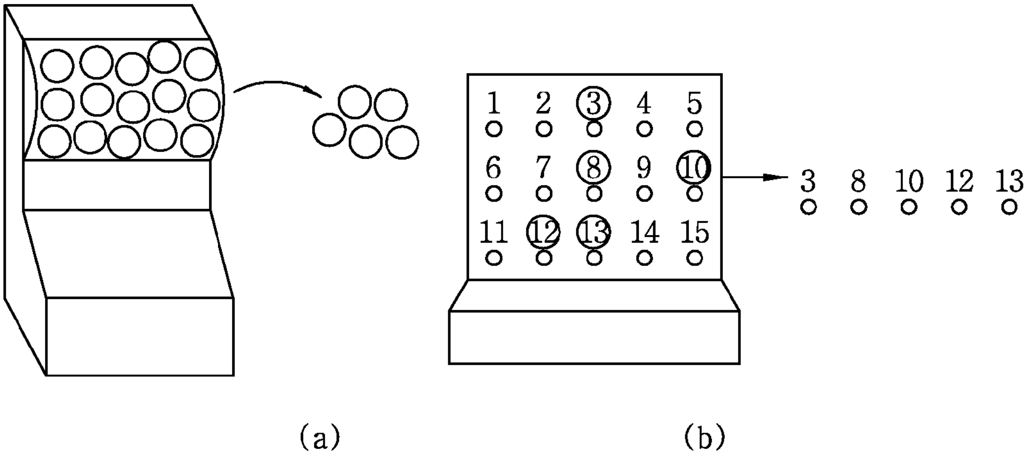
FIG. 6 is a view showing an interface for a capsule provision system of the capsule lottery server according to an embodiment of the invention.

In the meantime, if the system of extracting capsules from the capsule machine based on the user selection information delivered by the client terminals provides the number of capsules desired by users as selection information, as shown in FIG. 6(*a*), the capsule lottery control section may extract capsules corresponding to the desired number of capsules randomly from the capsule machine.

In addition, as shown in FIG. 6(*b*), the capsule lottery control section may number the capsules included in the capsule machine, provide the ranked capsules to the client terminals, and extract capsules corresponding to a selected number based on the user selection information to determine winning or not.

Hereinafter, detailed functions will be described based on the detailed configuration of the inventive online capsule lottery system.

Figure 7:
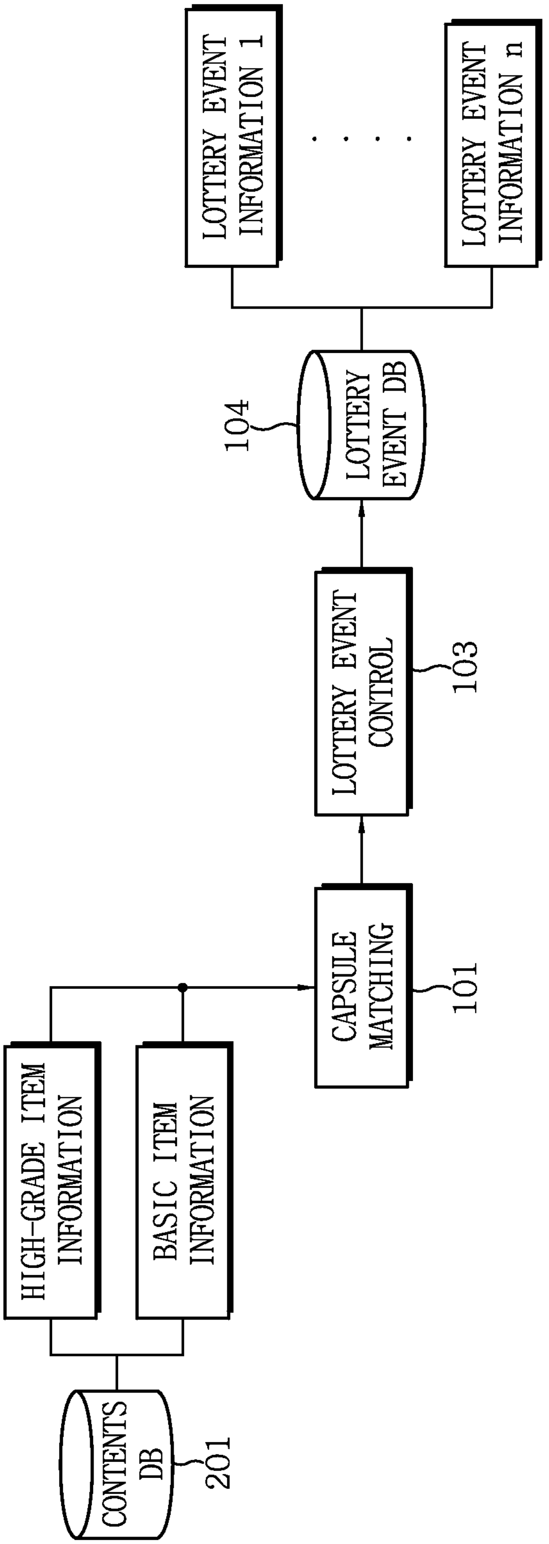
FIG. 7 is a view showing a lottery event generation process of the capsule lottery server according to an embodiment of the invention.

FIG. 7 is a view showing a lottery event information generation process of the capsule lottery server. As described earlier, the capsule matching section 101 delivers matching information, which is generated by matching high-grade item contents stored in the contents DB 201 and capsules, to the lottery event control section 103 which may then generate lottery event information based on the matching information to be stored in the lottery event DB 104.

At this time, the contents DB 201 of the game contents provision server may further include basic item contents having lower scarcity and ability ranking than high-grade item contents in an online game and the capsule matching section 101 may extract the basic item contents and include them in the matching information with match of them to remaining capsules except capsules matched to the high-grade item contents. Accordingly, when capsules of the client terminals are matched to the basic item contents, the capsule lottery control section may register the basic item contents with the membership information of the member DB.

Figure 8:
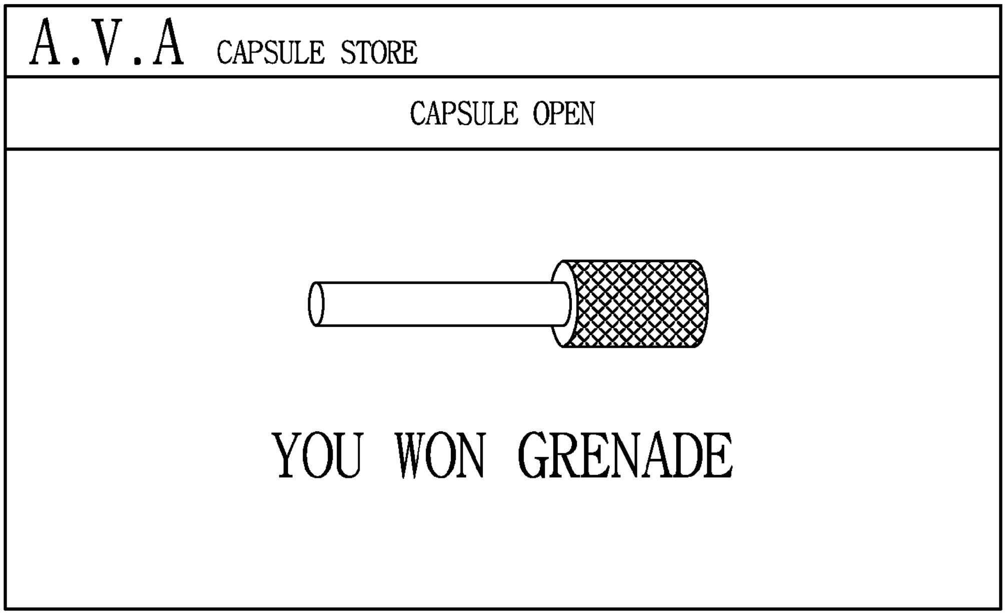
FIG. 8 is a view showing an example of provision of basic item contents when a capsule matching the basic item contents of the capsule lottery server is extracted according to an embodiment of the invention.

FIG. 8 is a view showing an example of provision of basic item contents when capsules matching the basic item contents of the capsule lottery server are extracted by the client terminals, in which information on only won basic item contents may be displayed to the client terminals without displaying information on winning unlike the winning of the high-grade item contents. As shown in FIG. 8, the basic item contents may include, for example, game money, contents, such as a grenade, having lower scarcity and ability ranking or value than the high-grade item contents in a game, etc.

In addition, the contents DB 201 of the game contents provision server may include coupons and generate and store a list of special item contents matching the coupons. In this case, the special item contents may be items which can be acquired only by the coupons.

Accordingly, the capsule matching section 101 may include matching of the coupons to capsules in the matching information, and, when the client terminals extract capsules matching the coupons, the capsule lottery control section may register the coupons with the membership information of the member DB. Thereafter, the client terminals may determine whether or not to use the coupons registered with the membership information, and, based on the determination, the game contents provision server may provide the special item contents corresponding to the coupons based on the list.

Figure 9:
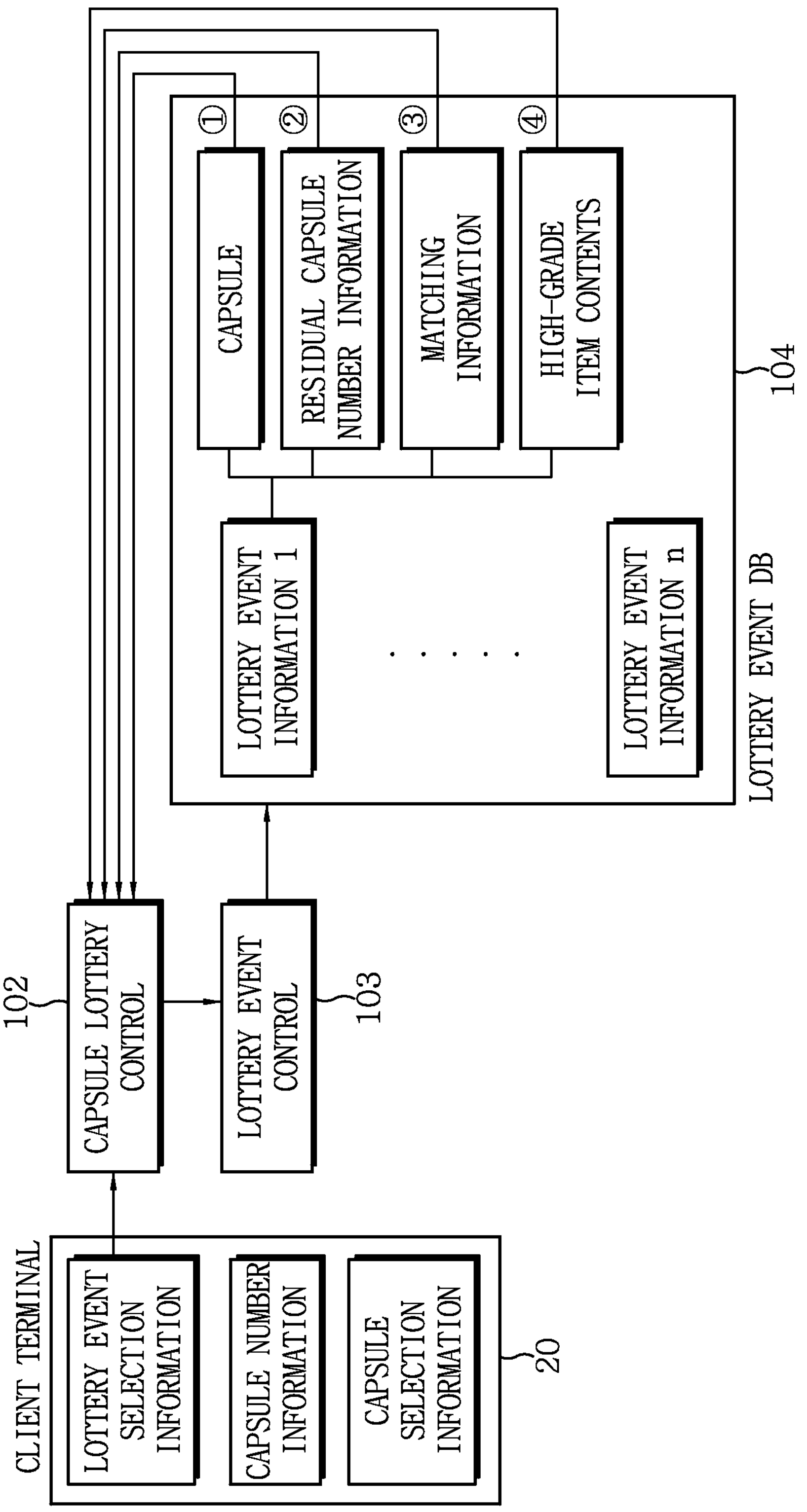
FIG. 9 is a view showing a winning verification process of the capsule lottery server according to an embodiment of the invention.

FIG. 9 is a view showing a winning verification process of the capsule lottery server in detail. As described above, when the lottery event information is generated, the capsule lottery control section 102 may provide the client terminals with the list about various types of lottery event information in the lottery event DB 104 and the information on high-grade item contents included in each of the various types of lottery event information, and the client terminals may receive, from users, lottery event selection information, which selects lottery event information including desired high-grade item contents from the various types of lottery event information, and deliver the received lottery event selection information to the capsule lottery control section 102.

Thereafter, the capsule lottery control section 102 may display the lottery event information corresponding to the lottery event selection information, and additional information on the client terminals 20, receive, from the client terminals 20, information on the number of capsules to be extracted from the lottery event information, and randomly extract the number of capsules corresponding to the capsule number information from the lottery event information (①). In addition, as described earlier, when the capsule lottery control section 102 provides the client terminals 20 with number information generated by numbering capsule information, the capsule number information is replaced with capsule selection information generated by user's selecting a desired one of the number information, and the capsule lottery control section 102 may extract capsules corresponding to the capsule selection information.

When the capsules are extracted, the capsule lottery control section 102 may change the residual capsule number information in real time and provide the changed information to the plurality of different client terminals 20 participating in the same lottery event information in real time (②). The fewer number of capsules included in the capsule residual number information provides higher winning odds.

Thereafter, the capsule lottery control section 102 determines winning or not of the extracted capsules based on the matching information included in the lottery event information (③). If winning is made, the capsule lottery control section 102 extracts the high-grade item contents (④) and registers the extracted high-grade item contents with the membership information of the membership server.

Figure 10:
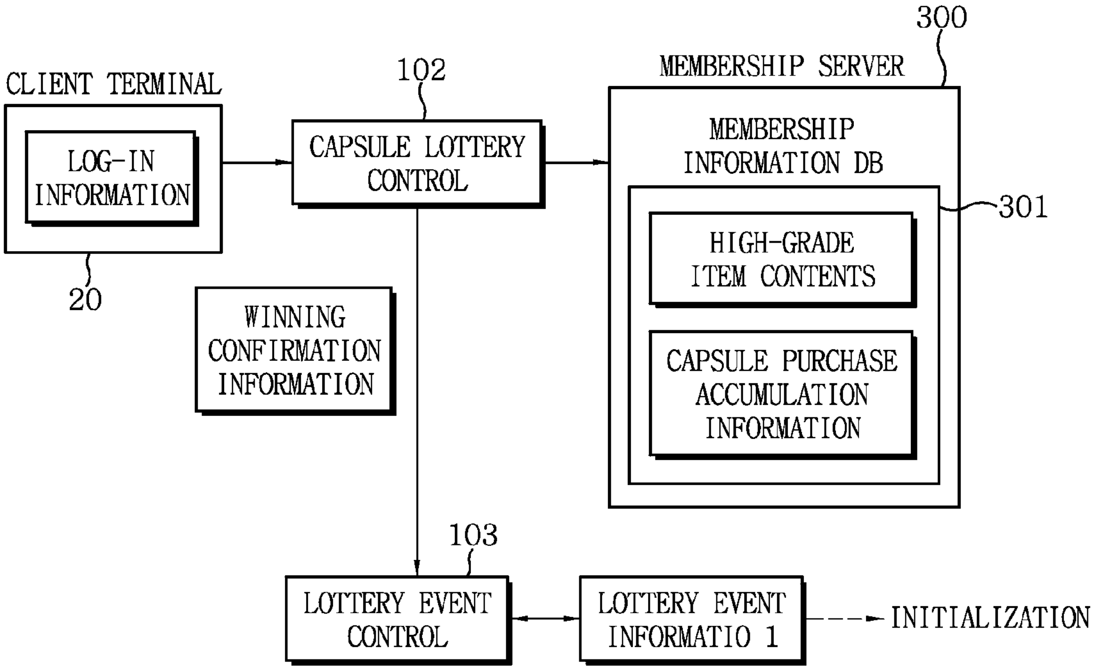
FIG. 10 is a view showing a lottery event initialization process of the capsule lottery server according to an embodiment of the invention.

In the meantime, when the capsules extracted by the client terminals are won, the capsule lottery control section registers the high-grade item contents corresponding to the users of the client terminals with the membership information and performs a process of initializing the won lottery event information, which will be described in detail with reference to FIG. 10.

When the extracted capsules are won, based on the log-in information provided in access of the client terminals 20 to the game contents provision server, the capsule lottery control section 102 registers the high-grade item contents with the membership information corresponding to the users of the client terminals 20 with the member DB 301 of the membership server 300 to allow the users to use the high-grade item contents in an online game provided by the game contents provision server. Thereafter, the capsule lottery control section 102 delivers winning confirmation information to the lottery event control section 103 which may then initialize the lottery event information based on the winning confirmation information.

Thereafter, based on the matching information generated by the capsule matching section' matching the high-grade item contents to the capsules, the lottery event control section 103 may reactivate the initialized lottery event information.

In addition, if there exists no won capsule information in the capsule information extracted by the client terminals 20, the capsule lottery control section 102 may maintain the lottery event information and generate capsule purchase accumulation information by accumulating the number of capsules extracted up to recently by the users of the client terminals 20 in the member DB 301.

Through this process, in order to prevent the users of the client terminals who purchase many capsules and participate in the lottery from being damaged due to rare capsule winning, the capsule lottery control section may control a probability of extraction of won capsule information of the users based on the capsule purchase accumulation information of the member DB corresponding to the log-in information, which will be described in more detail with reference to FIG. 11.

Figure 11:
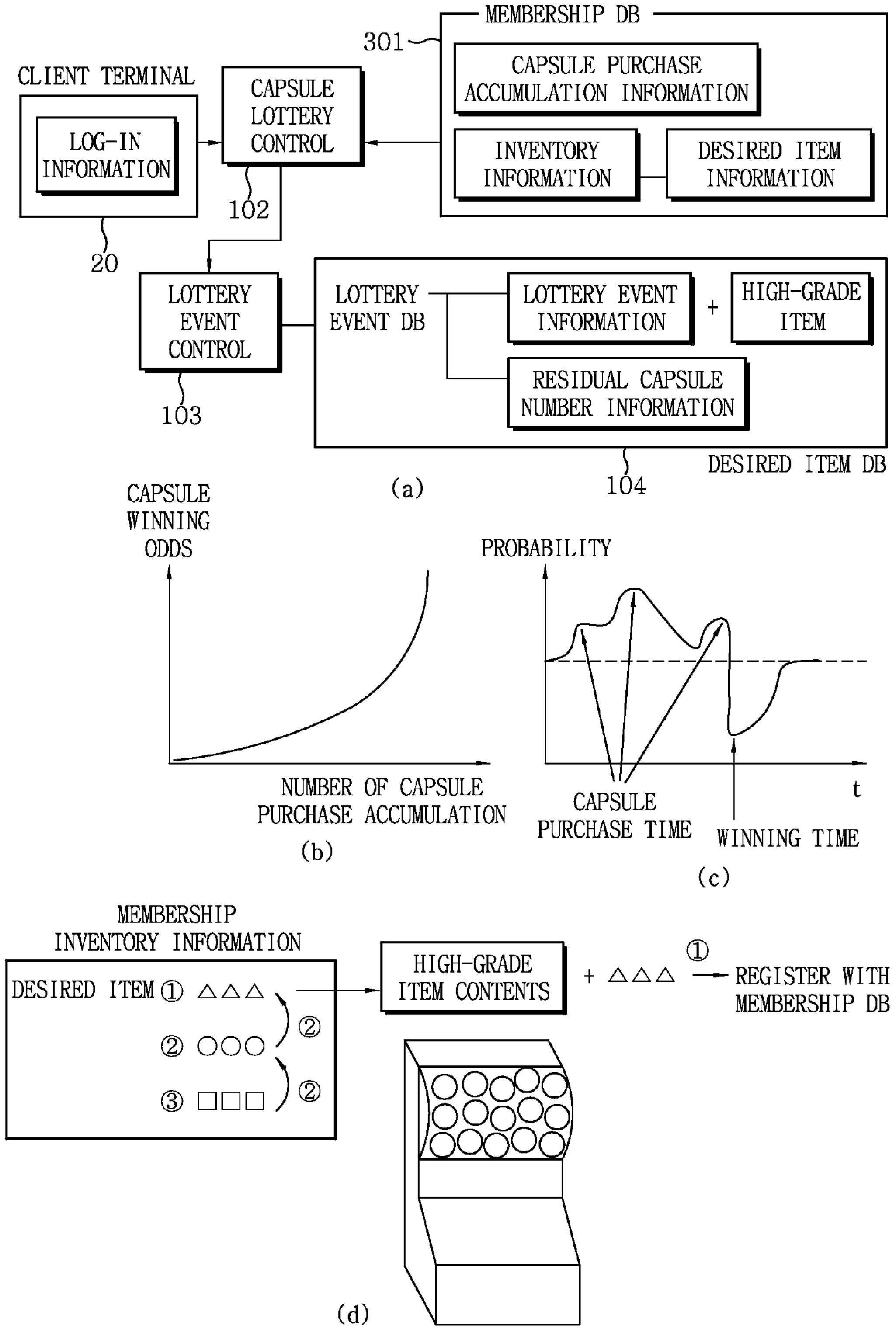
FIG. 11 is a view showing additional functions of the capsule lottery server according to an embodiment of the invention.

FIG. 11 is a view showing additional functions of the online capsule lottery system according to an embodiment of the invention. Referring to FIG. 11(*a*) first, in order to overcome a problem of few users who participate in the first lottery or when many residual capsules are left due to the fact that the fewer number of residual capsules provides higher winning odds based on the residual capsule number information, desired item information on a desired one of item contents used in the online game may be set in the inventory information included in the member DB 301 of the membership server 300.

In other words, for users who participate in the lottery when the number of residual capsules is more than a predetermined number, if the number of residual capsules generated after extraction is more than the predetermined number of residual capsules based on the residual capsule number information generated according to the capsules extracted by the client terminals 20 and the extracted capsules are won, the capsule lottery control section 102 may provide the desired item contents in addition to the high-grade item contents, thereby providing an increased rate of initial participation of users in a lottery event.

In the meantime, as described above, based on the log-in information delivered by the client terminal 20 and the capsule purchase accumulation information of the member DB shown in FIG. 11(*a*), the capsule lottery control section 102 may detect the number of capsule purchase accumulation as shown in FIG. 11(*b*) and increase user's winning odds corresponding to the log-in information with increase in the number of capsule purchase accumulation.

In addition, as shown in FIG. 11(*c*), the capsule lottery control section may decrease the winning odds with lapse of time from the point of time of capsule purchase and again increase the winning odds for additional capsule purchase. Accordingly, as a longer interval between capsule purchase events provides lower winning odds and the winning odds is again for the additional capsule purchase, users may participate in the lottery constantly in order to maintain the winning odds. In addition, when the users extract won capsules during increase in the winning odds and are paid with high-grade item contents, the capsule lottery control section may decrease the capsule winning odds by initializing the capsule purchase accumulation information while registering the high-grade item contents with the member DB.

In the meantime, as described with reference to FIG. 11(*a*), for registration of desired item information, the membership server may provide a list of registration of desired item contents with the inventory information of members as shown in FIG. 11(*d*) and designate a rank based on a degree of desire.

Accordingly, if the number of residual capsules except the number of capsules extracted by the client terminals is more than the predetermined number of residual capsule, the capsule lottery control section may register the first-ranked item contents from the list with the registered desired item contents, along with the high-grade item contents, with the inventory information of the member DB. Thereafter, the membership server may delete the paid desired item contents, place the second-ranked desired item contents on the first rank, and provide desired item contents corresponding to the second rank in provision of desired item contents through the above-described process.

Figure 12:
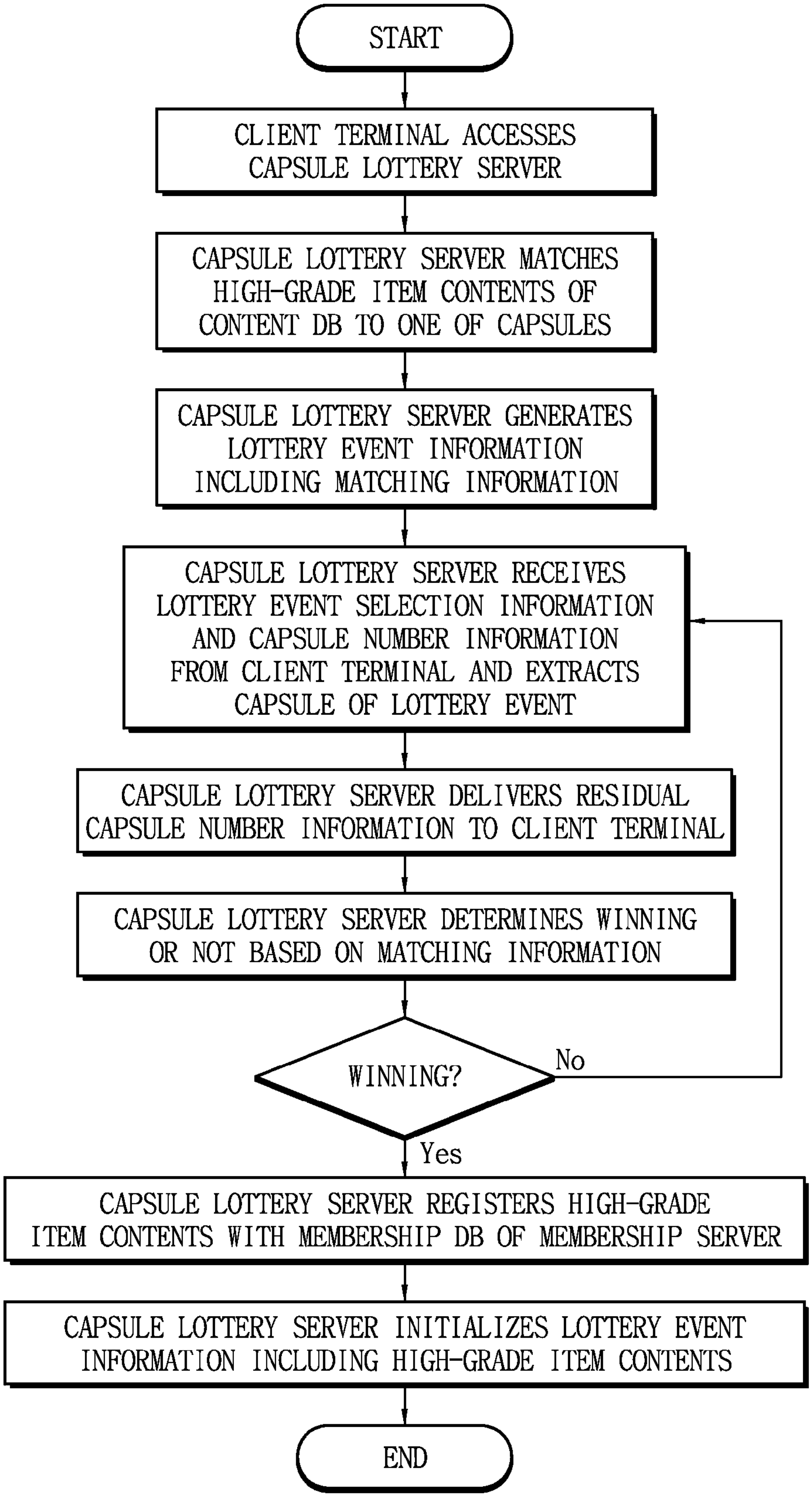
FIG. 12 is a flow chart of operation of an online capsule lottery system.

FIG. 12 is a flow chart of a capsule lottery service method of an online capsule lottery system according to an embodiment of the invention. When the client terminals access the capsule lottery server through the game contents provision server, the capsule lottery server may recognize users based on the log-in information of the client terminals, generate matching information by matching high-grade item contents in the contents DB to capsules, and generate a piece of lottery event information based on the matching information including the high-grade item contents.

Thereafter, the capsule lottery server receives the number of capsules purchased in terms of game money or cash by the client terminals which selected the lottery event information, or selection information on designated capsules, extracts capsules included in the lottery event information, determines winning or not of the extracted capsules based on the matching information while updating residual capsule number information in real time.

If winning is made, the capsule lottery server may register high-grade item contents with the member DB of the membership server to apply the high-grade item contents to an online game provided by the game contents provision server, and initialize the lottery event information including the high-grade item contents. Otherwise, the capsule lottery server receives the selection information from the client terminals while maintaining the lottery event information.

What is claimed is:

1. An online capsule lottery method in which a capsule lottery server in association with a game contents provision server providing an online game and a membership server providing membership information provides high-grade item contents having high ability ranking measured in the online game to one of a plurality of client terminals which participates in lottery, comprising:

a first step in which the client terminals access the capsule lottery server by providing log-in information of users to the game contents provision server;

a second step in which the capsule lottery server comprising capsules generates matching information by matching the high-grade item contents to at least one capsule and delivers information on a number of remaining capsules to the plurality of client terminals in real time;

a third step in which the capsule lottery server receives selection information of the client terminals and extracts a number of capsules selected by the users or designated capsule selected by the user from the capsules; and a fourth step in which the capsule lottery server determines whether or not there exist won capsules matched to the high-grade item contents among the capsules extracted through the third step based on the matching information, provides information on winning or not to the client terminals, registers the high-grade item contents with the membership information of the membership server if the won capsule exists, and provides information on the number of remaining capsules generated except the extracted capsules to the plurality of client terminals in real time until at least one won capsule exists.

2. The online capsule lottery method according to claim 1, wherein the matching information further includes information on capsules matched to basic item contents having lower ability ranking than the high-grade item contents.

3. The online capsule lottery method according to claim 1, wherein the second step includes a step in which the capsule lottery server generates at least one of lottery event information including the predetermined number of capsules including at least one of the matching information, and provides the lottery event information to the client terminals.

4. The online capsule lottery method according to claim 3, wherein the second step further includes a step in which the capsule lottery server provides information on high-grade item contents included in the lottery event information, and the third step includes a step of selecting capsules from the lottery event information including high-grade item contents desired by users based on the selection information.

5. The online capsule lottery method according to claim 1, wherein the fourth step includes a step in which the capsule lottery server provides information on winning or not to other client terminals which participate in the capsule lottery.

* * * * *